Patented Sept. 19, 1933

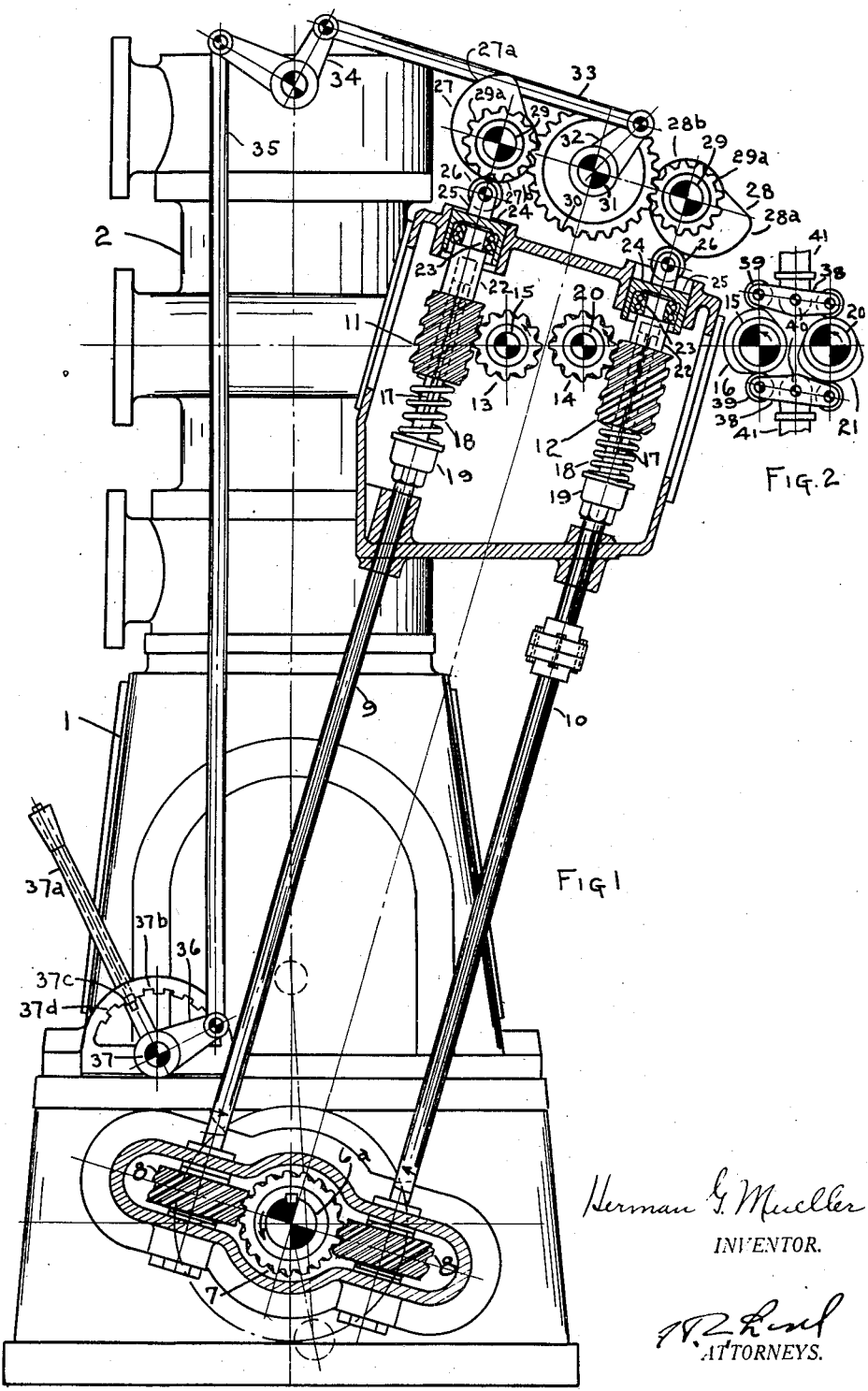

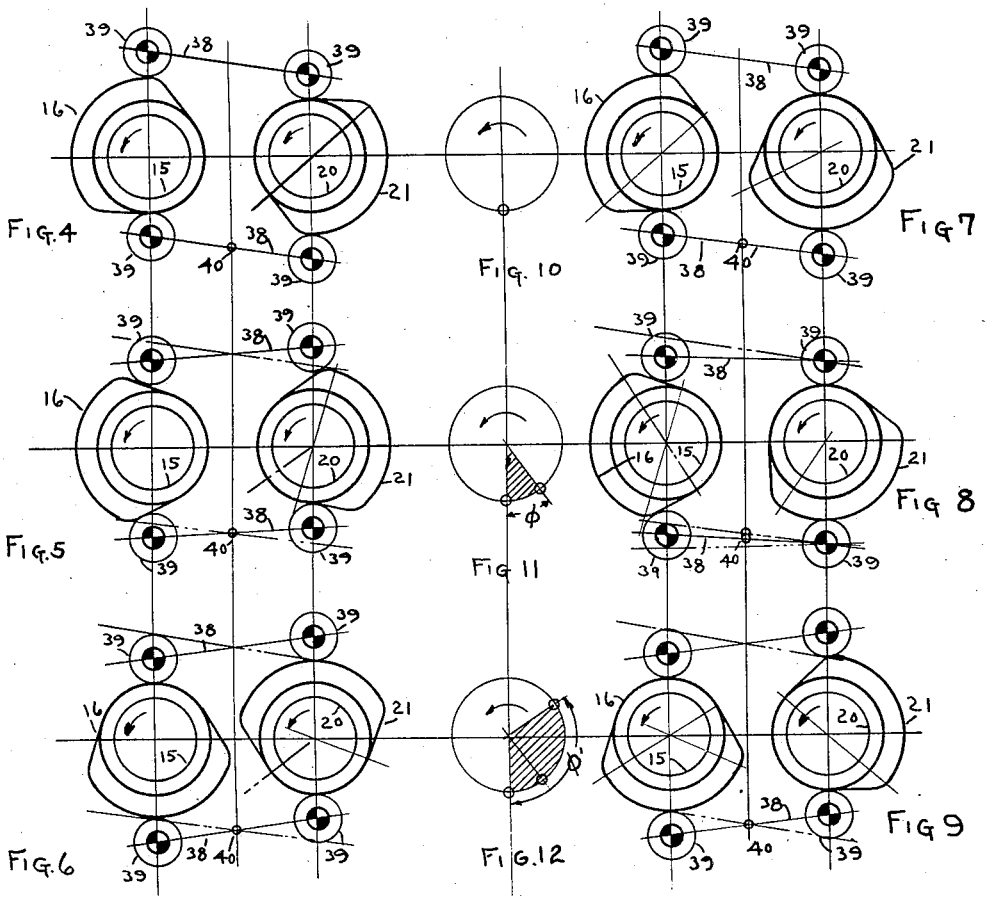

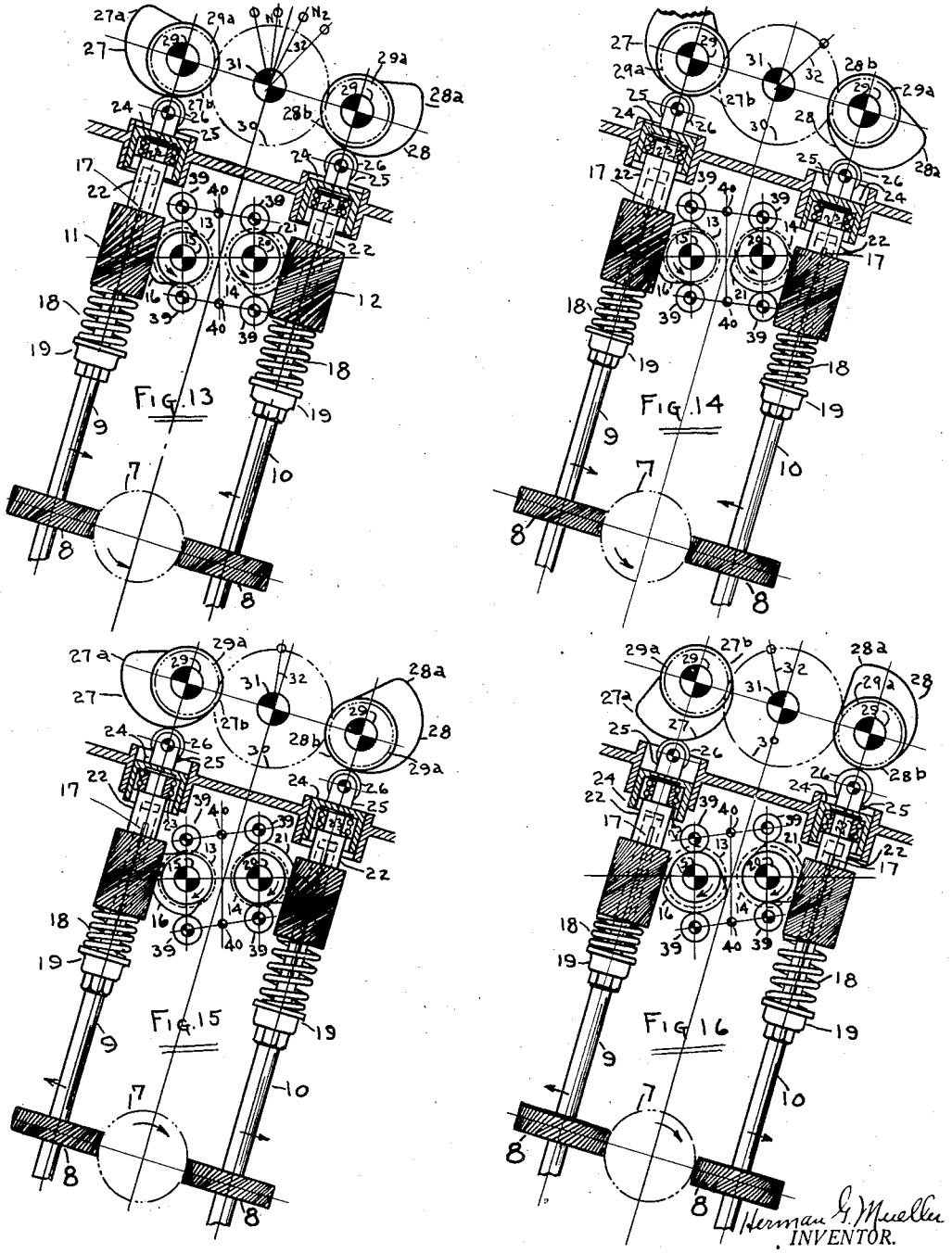

1,927,525

UNITED STATES PATENT OFFICE 1,927,525

REVERSING VALVE GEAR

Herman G. Mueller, Erie, Pa., assignor to Skinner Engine Company, Erie, Pa., a corporation of Pennsylvania Application December 7, 1927. Serial No. 238,436
Renewed February 4, 1929

17 Claims. (Cl. 121—127)

The present invention is designed to simplify reversing valve gears, improve the valve performance, and reduce the inertia effects and power necessary for throwing the gear. The valve gear involves the use of supplementary cams, the combined action of the cams being conveyed to the valve. In each direction of movement one of the cams operates as an opening cam and thus permits of a constant, or slightly variable opening independently of the adjustment of the closing of the valve. The other cam operates as a closing cam and may be swung independently of the opening cam so as to get closing at any point desired. In varying the cut-off the closing cam alone is operated and as this cam is relieved of the power necessary to open the valve very slight variation is required to actuate the closing valve and thus its adjustment and it is this valve that is operated in bringing the valve mechanism to neutral and reversing the same. The power necessary for reversal of the valve gear is consequently very slight. Further the greater part of the valve gear is rotary and consequently the inertia losses are very slight. Further features and details of the invention will appear more fully from the specification and claims.

A preferred embodiment of the invention is illustrated in the accompanying drawings as follows:—

Fig. 1 shows a side elevation of the engine, parts of the valve gear being in section to better show construction.

Fig. 2 shows a detail view of the valve actuating cams and the cam riders.

Figs. 4, 5 and 6 are diagrammatical views of the valve gear with the cams set at neutral.

Figs. 7, 8 and 9 show the cams with one cam varied to effect an opening of the valve.

Figs. 10, 11 and 12 show diagrams of crank positions with the positions of cams shown in Figs. 8, 9 and 10.

Fig. 13 shows a view of the valve gear set for forward running with short cut-off.

Figure 3:
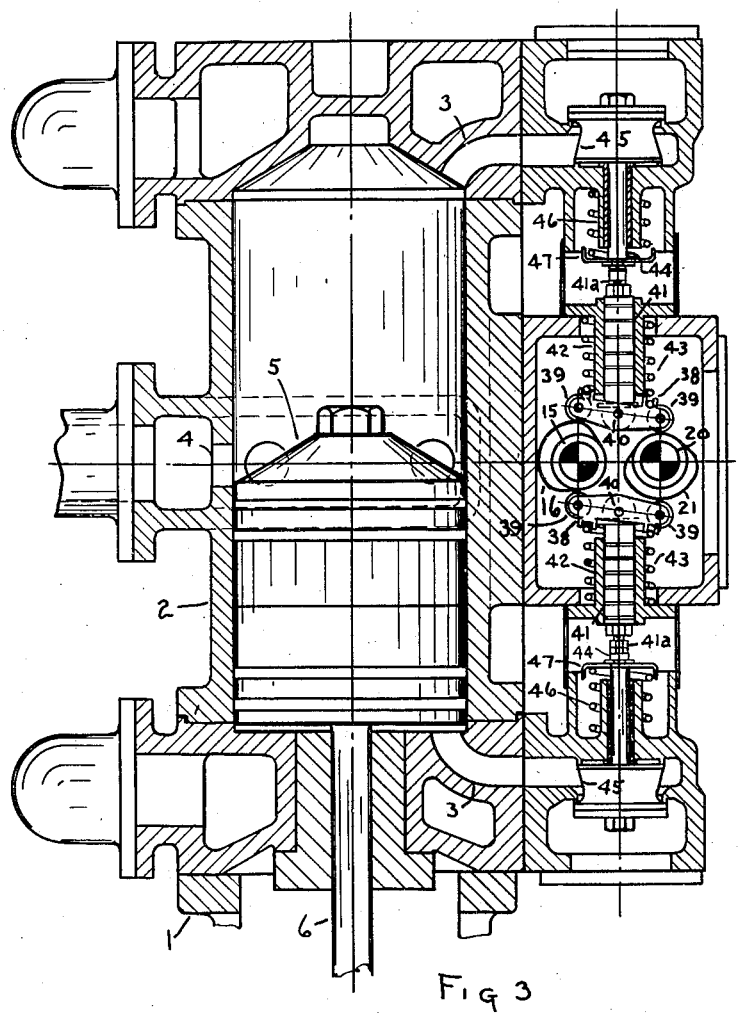
Fig. 3 is a central section through a cylinder and valves therefor showing the valve cams and connections.

Fig. 14 a similar view with the valve gear advanced with a forward direction of running.

Fig. 15 a similar view with the valve gear reversed and but slight cut-off.

Fig. 16 a view with the valve gear reversed and at long cut-off.

1 marks the engine frame, 2 the engine cylinder, 3 the inlet ports to the engine, 4 the central exhaust ports, 5 the piston which as shown is an elongated piston of the typical Uniflow engine, the piston operating from the central exhaust ports to control the same, and 6 the piston rod, which piston rod operating through a connecting rod and crank (not shown) drives the crank shaft 6a. A helical gear 7 is fixed on the crank shaft and operates the helical gears 8. The helical gears drive cam driving shafts 9 and 10 which are mounted in suitable bearings in the frame. Helical gears 11 and 12 are mounted on the shafts 9 and 10 and drive helical gears 13 and 14. The helical gears 13 and 14 are mounted on cam shafts 15 and 20 which run crosswise of the engine cylinder. Valve actuating cams 16 and 21 are arranged on the shafts 15 and 20 respectively. The gears 11 and 12 are locked against rotation on the shafts 9 and 10 by splines 17 but are free to move axially on said shafts. They are yieldingly forced in one direction by springs 18, the springs being seated on shoulders 19 carried by the shafts 9 and 10. The gears 11 and 12 have extensions 22 which are secured by ball bearings 23 with the push sleeves 24. These sleeves have extending ears 25 between which are journaled the rollers 26. The rollers 26 are engaged by cams 27 and 28. The cam 27 has the high inclined, or cam actuated surface 27a of scroll contour and the low surface 27b. The cam 28 has similar surfaces 28a and 28b respectively. These cams 27 and 28 are mounted on shafts 29. The shafts 29 are provided with gears 29a which gears mesh with a gear 30. The gear 30 is fixed on a shaft 31. A rock arm 32 extends from the shaft 31 and is connected by a link 33 with a bell crank lever 34. The bell crank lever 34 is connected by a link 35 with a rock arm 36. The rock arm 36 is fixed on a shaft 37. A control lever 37a is fixed on the shaft 37. The control lever operates around a segment 37b and is provided with a latch 37c which is adapted to operate in detents 37d in the segment. It will readily be seen that by throwing the control lever the cams 27 and 28 are thrown through the linkage described and as the cams 27 and 28 are thrown they move the thrust sleeves 24 and consequently the helical gears 11 and 12 axially.

The valve actuating cams 16 and 21 actuate riders 38, these riders spanning the space between the cams and being responsive to their combined action. Rollers 39 are arranged on the riders and have contact with the cam surfaces. The riders are pivoted by a pin at 40 to a thrust rod 41. The thrust rod is slidingly mounted in a sleeve 42 and springs 43 operate against the riders to maintain them in contact with the cams. The push rods operate through connections 41a against valve stems 44. Steam valves 45 are actuated by the stems and control the ports 3. Springs 46 operating on heads 47 on the stems seat the valves.

The action of the cams on the rider and consequently on the valve mechanism is diagrammatically illustrated in Figs. 4 to 12. In Figs. 4 to 6 the cams are set at neutral, one rocker being on the high surface of one cam while the other rocker is on the low surface of its cam and the inclinations are so adjusted one to the other that there is no valve movement with the cams so set. The figures show the cams in the three positions of the crank. In Figs. 7, 8 and 9 the cams are shown with one of the cams, the cam at the right swung to effect an opening of the valve and Figs. 10, 11 and 12 show the positions of the crank with the corresponding positions of the cams shown in Figs. 7, 8 and 9. It will be understood that with the valves operating as in Figs. 7, 8 and 9 the cam 21 is operating as the closing cam and the cam 16 remains practically constant giving a constant opening time to the valve whereas the valve 21 has been swung to give a valve opening, the cut-off position being shown in Fig. 9. My reference here is to the lower rocker.

With the reversing gear shown, either the cam 16, or 21 may operate as the closing cam. With the controlling cams 27 and 28 thrown to neutral position the cams operate as shown in Figs. 4, 5 and 6. With a movement of the control lever throwing the cam 28 clockwise and thus bringing its high surface into action the helical gear 12 is actuated forcing the gear 12 in an axial direction and rotating the helical gear 14 relatively to the helical gear 13 and thus varying the cam 21. At the same time the cam 27 operates on the low surface and holds the helical gear 11 approximately constant for the timing of the opening of the valve. The cam 27 maintains this constant relation as the cam 28 is thrown throughout the high or scroll surface 28a. Thus any point of cut-off may be given to the valves with the forward running of the engine through this swinging of the eccentric 28. Reversing the control lever and swinging the eccentrics 27 and 28 in the reverse direction the low surface 28b of the eccentric 28 is brought into action thus bringing the gear 12 to the proper position for opening and as the cam 27 is swung bringing the high surface 27a into action the helical gear 11 is forced downwardly rotating the gear 13 to adjust the cam 16 to any point of cut-off desired.

It will be noted that in either instance the thrust and power for opening the valve is on the cam which is relatively stationary and thus the reversing gear is relieved of this thrust and that the opening of the valve is accomplished with the rider on the high surface of the closing valve so that the rider rides the cam as the valve is closed and that the closing cam is moved to accomplish a variation in cut-off, or reversal with practically no steam load on the valve and with the inclination of the cam tending to assist the movement. The movement of the rider on the closing cam from the low surface to the high surface takes place with the valve in neutral position and with no operation of the valve. This being so, the power necessary to effect the reversal is very small and is only a fraction of the power required in ordinary link reversal. Further the greater part of this mechanism is rotating so that the power losses in driving the valve gear are very small.

I prefer to vary slightly the low surfaces 27b and 28b to vary the timing of the opening of the valve sufficiently to retard the lead for late cut-off. This results in a very slight variation in the form of the surface but is desirable in relation to late cut-off, particularly in starting the engine under load.

What I claim as new is:—

1. In a reversing valve gear, the combination of a valve; two cam shafts; a cam on each shaft, each cam maintaining a constant contour and having a high and low cam surface; a rider on said cams having movement responsive to and a resultant of their combined action both the high surfaces and both the low surfaces acting simultaneously on the rider in different points of the action of the cams on the rider; a connection between the rider and the valve; means acting with the shafts driving the cams from the engine; and reversing devices acting with the shafts on said cams varying their relation to reverse the valve, the driving means maintaining a constant driving connection between the cams and the engine.

2. In a reversing valve gear, the combination of a valve; two cam shafts; a cam on each shaft, each cam maintaining a constant contour and having a high and low cam surface; a rider on said cams responsive to their combined action both the high surfaces and both the low surfaces acting simultaneously on the rider in different points of the action of the cams on the rider; a connection between the rider and the valve; means acting with the shafts driving the cams from the engine; and reversing devices acting with the shafts on said cams varying their relation to reverse the valve comprising means varying the advance of either of said cams to vary the cut-off, the driving means maintaining a constant driving connection between the cams and the engine.

3. In a reversing valve gear, the combination of a valve; two cam shafts; a cam on each shaft, each cam maintaining a constant contour and having a high and low cam surface; a rider on said cams having movement responsive to and a resultant of their combined action both the high surfaces and both the low surfaces acting simultaneously on the rider in different points of the action of the cams on the rider; a connection between the rider and the valve, each of said cams timing the opening of said valve with one running direction of the engine and timing the closing of the valve with the other running direction of the engine; means acting with the shafts driving the cams from the engine; and reversing devices acting with the shafts on said cams varying their relation to reverse the valve, the driving means maintaining a constant driving connection between the cams and the engine.

4. In a reversing valve gear, the combination of a valve; two cam shafts; a cam on each shaft, each cam maintaining a constant contour and having a high and low cam surface; a rider on said cams having movement responsive to and a resultant of their combined action both the high surfaces and both the low surfaces acting simultaneously on the rider in different points of the action of the cams on the rider; a connection between the rider and the valve, each of said cams timing the opening of said valve with one running direction of the engine and timing the closing of the valve with the other running direction of the engine; means acting with the shafts driving the cams from the engine; and reversing devices acting with the shafts on said cams varying their relation to reverse the valve, comprising means varying the advance of the cam timing the closing to vary the cut-off of the valve, said driving means maintaining a constant connection between the cams and the engine.

5. In a reversing valve gear, the combination of a valve; two cams; a rider on said cams responsive to their combined action; a connection between the rider and the valve; driving means comprising helical gears driving said cams with rotating movement and advancing or retarding the cams with an axial movement; and reversing devices moving the gears axially to throw the cams to reverse position, said driving means maintaining a constant driving connection between the driving means and the cams.

6. In a reversing valve gear, the combination of a valve; two cams; a rider on said cams responsive to their combined action; a connection between the rider and the valve; driving means comprising helical gears driving said cams with rotating movement and advancing, or retarding the cams with an axial movement; and reversing devices moving the gears axially to throw the cams to reverse position, said devices varying the advance of one of the cams for varying the cut-off with one direction of running and the other of said cams with a reverse direction of running of the engine, said driving means maintaining a constant driving connection between the driving means and the cams.

7. In a reverse valve gear, the combination of a valve; two cams shafts; cams on said shafts; a rider on said cams responsive to their combined action; a connection between the rider and the valve; driving means comprising helical gears driving said cams through said cam shafts, said gears operating in unison through a rotative movement and varying the relation of the cams with an axial movement; and reversing devices moving the gears axially to throw the cams to reverse position, said driving means maintaining a constant driving connection between the driving means and the cams.

8. In a reverse valve gear, the combination of a valve; two cam shafts; cams on said shafts; a rider on said cams responsive to their combined action; a connection between the rider and the valve; driving means comprising helical gears driving said cams through said cam shafts, said gears operating in unison through a rotative movement and varying the relation of the cams with an axial movement; and reversing devices moving the gears axially to throw the cams to reverse position, said devices varying the advance of one of the cams for varying the cut-off with one direction of running and the other of said cams with a reverse direction of running of the engine, said driving means maintaining a constant driving connection between the driving means and the cams.

9. In a reversing valve gear, the combination of a valve; two valve actuating cams; a rider on said cams responsive to their combined movement; a connection between the rider and the valve; and controlling cams varying the relation of the actuating cams and alternately varying the relation of said cams to alternately make one the opening cam and the other the closing cam for reversal and for adjusting the cam acting as the closing cam independently of the opening cam to vary the cut-off.

10. In a reversing valve gear, the combination of a valve; two valve actuating cams; a rider on said cams responsive to their combined movement; a connection between the rider and the valve; helical gears driving said cams; said gears being rotated in unison and driving the cams in unison and varying the relation of the cams rotatively by an axial movement of said helical gears; and controlling cams acting on said helical gears and alternately operating on said helical gears to alternately make one of the cams the opening cam and the other of said cams the closing cam for reversal.

11. In a reversing valve gear, the combination of a valve; two valve actuating cams; a rider on said cams responsive to their combined movement; a connection between the rider and the valve; helical gears driving said cams, said gears being rotated in unison and driving the cams in unison and varying the relation of the cams rotatively by an axial movement of said helical gears; and controlling cams acting on said helical gears and alternately operating on said helical gears to alternately make one of the cams the opening cam and the other of said cams the closing cam for reversal and for adjusting the cam acting as the closing cam independently of the opening cam to vary the cut-off.

12. In a reversing valve gear, the combination of a valve; two valve actuating cams; two cam driving shafts; helical gears slidingly mounted on said cam driving shafts and driving said shafts, said cam driving shafts rotating in unison, said helical gears varying the relation of the cams by an axial movement on the cam driving shafts; actuating mechanism for reciprocating said gears comprising two controlling cams; a gear connection between the two controlling cams, said controlling cams having high and low surfaces in alternate relation, the low surface of one controlling cam controlling its gear during the operation of the high surface of the other controlling cam on its gear for adjusting said gears for reversal and cut-off; and means for throwing the said controlling cams for controlling the engine.

13. In a reversing valve gear, the combination of a valve; two valve actuating cams; two cam driving shafts; helical gears slidingly mounted on said cam driving shafts and driving said shafts, said cam driving shafts rotating in unison, said helical gears varying the relation of the cams by an axial movement on the cam driving shafts; actuating mechanism for reciprocating said gears comprising two controlling cams; a gear connection between the two controlling cams, said controlling cams having high and low surfaces in alternate relation, the low surface of one controlling cam controlling its gear during the operation of the high surface of the other controlling cam on its gear for adjusting said gears for reversal and cut-off; means for throwing the said controlling cams for controlling the engine; and springs yieldingly mounted on the cam driving shaft and yieldingly forcing a return movement of said spiral gears.

14. In a reversing valve gear, the combination of a valve; two cam shafts; a cam on each shaft, each cam maintaining a constant contour and having a high and low cam surface; a rider on said cams having movement responsive to and a resultant of their combined action, both the high surfaces and both the low surfaces acting simultaneously on the rider in different points of the action of the cams on the rider; a connection between the rider and the valve; and controlling cams varying the relation between said valve actuating cams throwing said valve actuating cams alternately to make one the opening cam and the other the closing cam for reversal and adjustment, said controlling cams having one surface for the closing cam and another controlling surface for the opening cam, the controlling surface for the opening cam varying the relation of the opening cam to vary the lead to correspond with the cut-off.

15. In a reversing valve gear, the combination of a valve; two cam shafts; a cam on each shaft, each cam maintaining a constant contour and having a high and low cam surface; a rider on said cams having movement responsive to and a resultant of their combined action, both the high surfaces and both the low surfaces acting simultaneously on the rider in different points of the action of the cams on the rider; a connection between the rider and the valve; driving means acting with said shafts driving the cams from the engine; and reversing devices acting on said cams varying their relation to reverse the valve, said reversing devices comprising an actuating control means and a connection between said control means and the cams positively maintaining a definite relation between the control means and the cams, said driving means maintaining a constant driving connection between the engine and the cams.

16. In a reversing valve gear, the combination of a valve; two cam shafts; a cam on each shaft, each cam maintaining a constant contour and having a high and low cam surface; a rider on said cams responsive to their combined action, both the high surfaces and both the low surfaces acting simultaneously on the rider in different points of the action of the cams on the rider; a connection between the rider and the valve; driving means acting with said shafts driving the cams from the engine; and reversing devices acting on said cams varying their relation to reverse the valve comprising means varying the advance of either of said cams to vary the cut-off, said reversing devices comprising an actuating control means and a connection between said control means and the cams positively maintaining a definite relation between the control means and the cams, said driving means maintaining a constant driving connection between the engine and the cams.

17. In a reversing valve gear, the combination of a valve; two cam shafts; cams on said shafts; a rider on said cams responsive to their combined action; a connection between the rider and the valve; helical driving means comprising gears driving said cams through said cam shafts, said gears operating in unison through a rotative movement and varying the relation of the cams with an axial movement; and reversing devices moving the gears axially to throw the cams in reverse position, said reversing devices comprising an actuating control means and a connection between said control means and the cams positively maintaining a definite relation between the control means and the cams, said driving means maintaining a constant connection between the driving means and the cams.

HERMAN G. MUELLER.